W. J. KNOX & F. J. HARRISON.
BRAKE RATCHET MECHANISM.
APPLICATION FILED APR. 17, 1914.
1,116,712.
Patented Nov. 10, 1914.
3 SHEETS—SHEET 1.
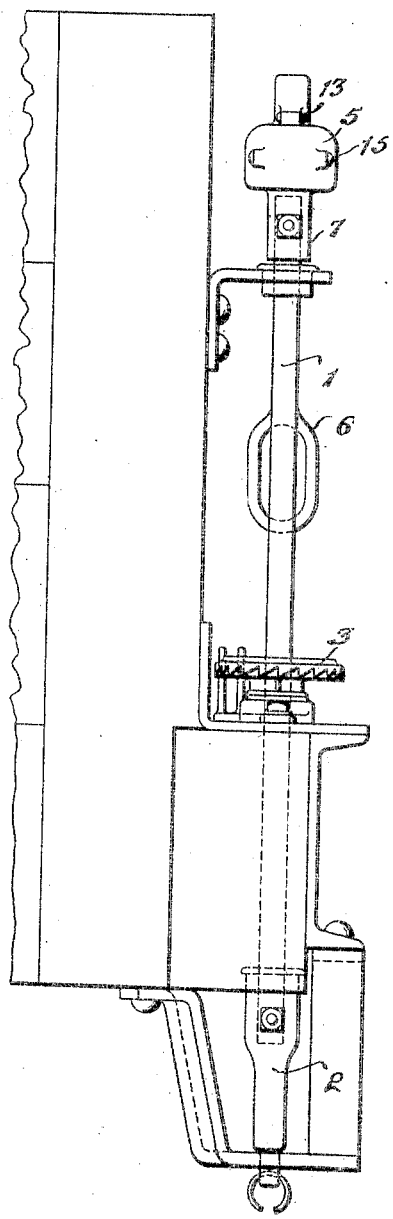
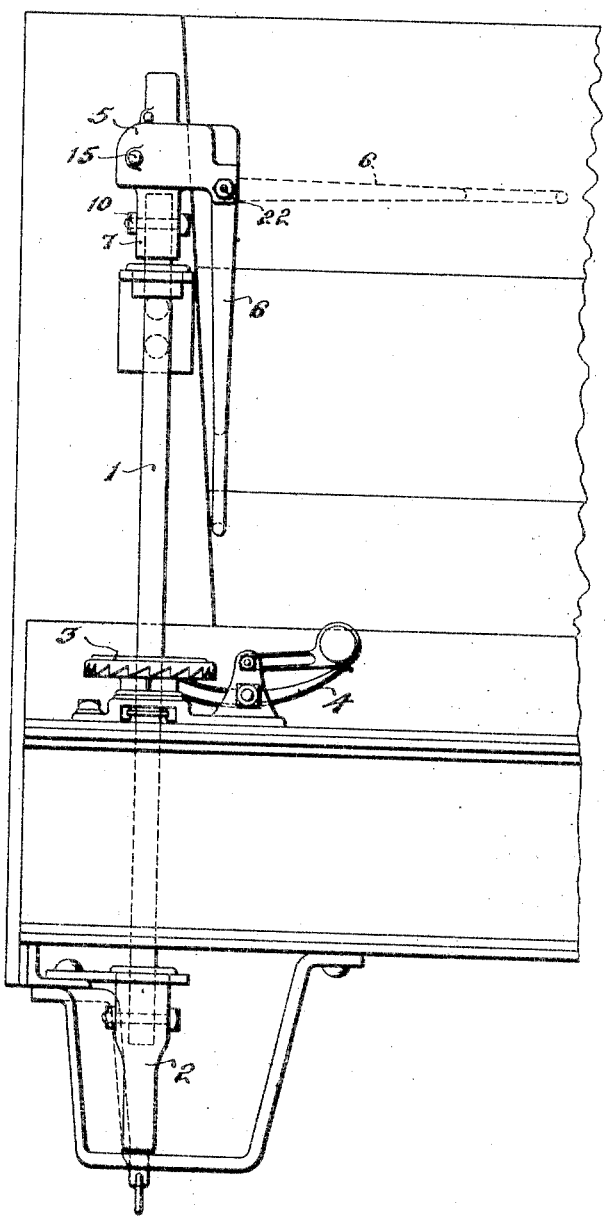

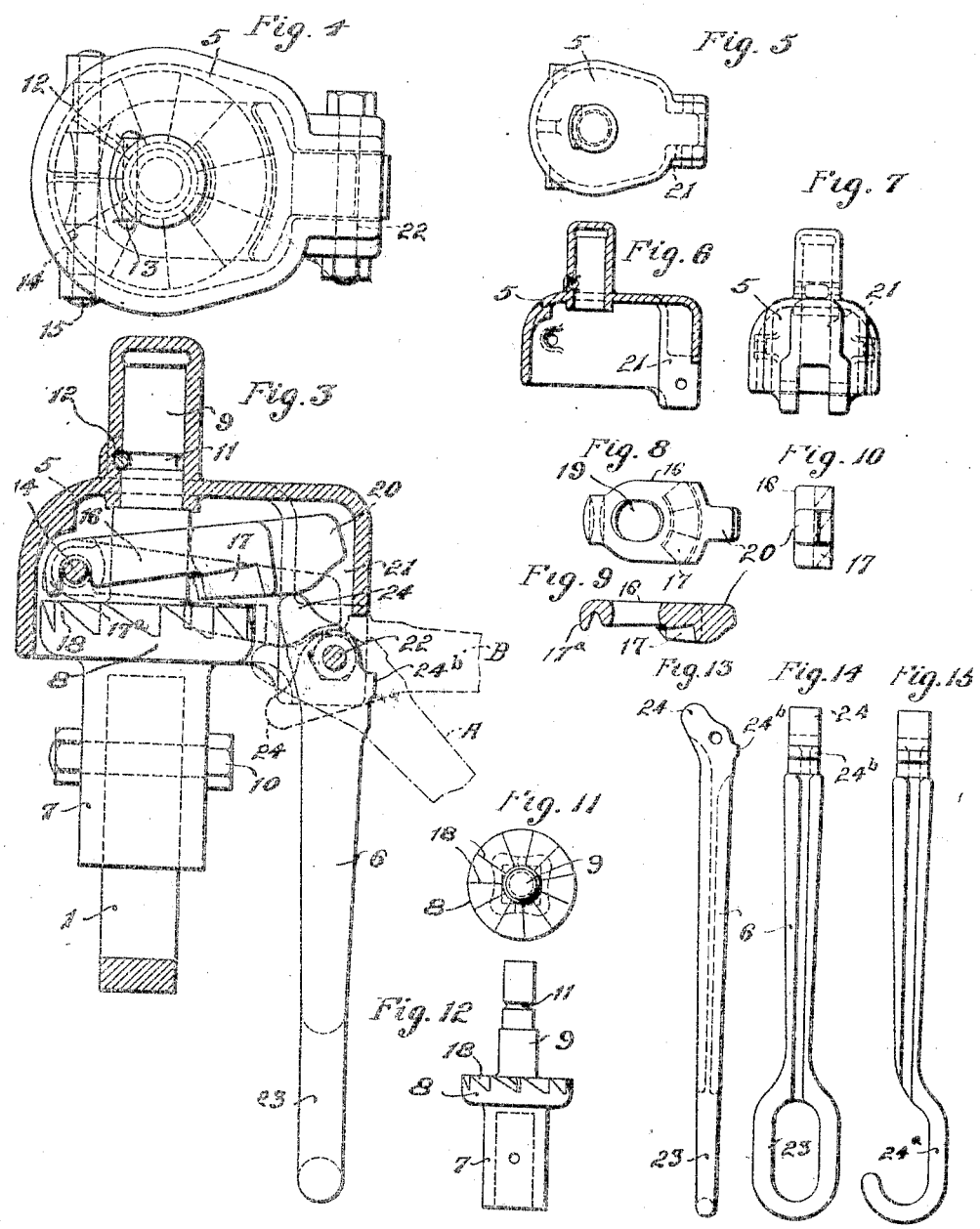

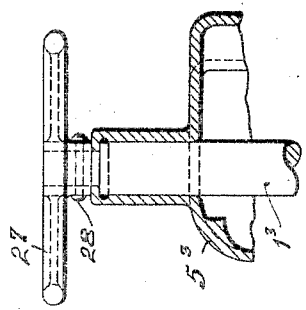
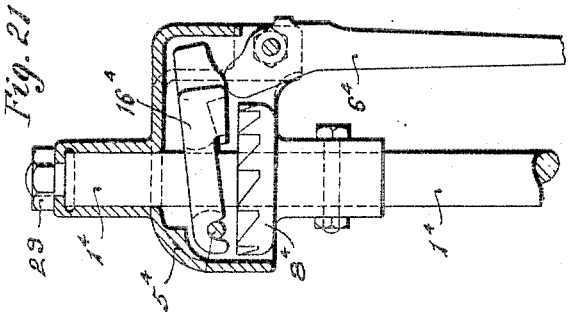
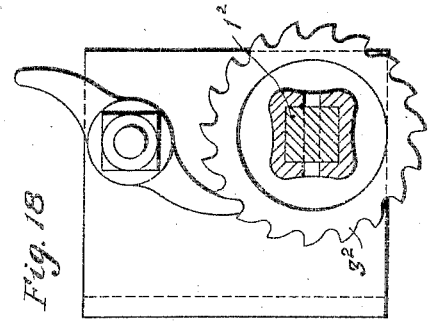
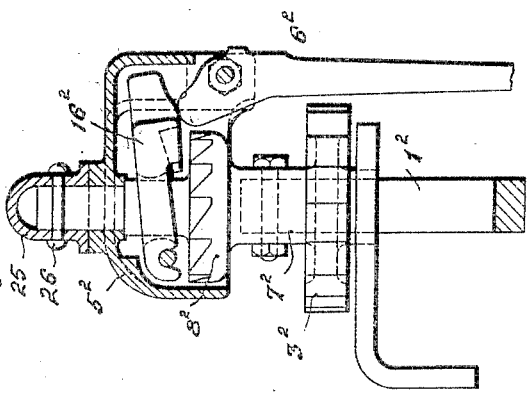
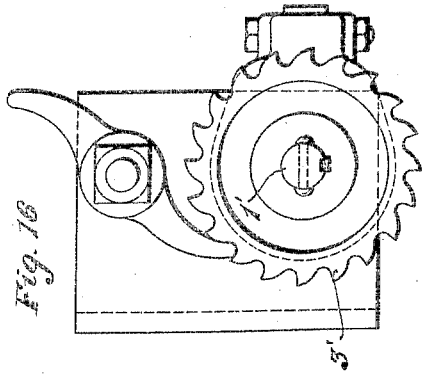
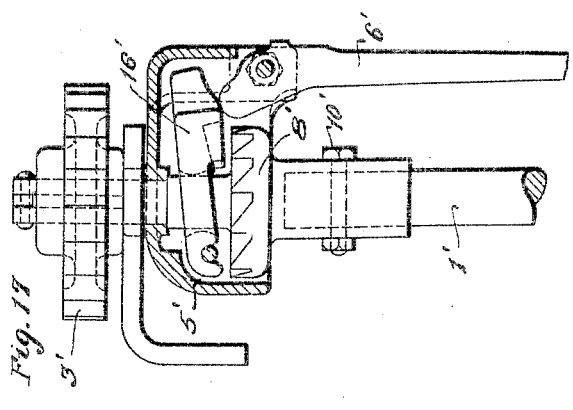

UNITED STATES PATENT OFFICE.

WILLIAM J. KNOX AND FREDERICK J. HARRISON, OF DUBOIS, PENNSYLVANIA.

BRAKE RATCHET MECHANISM.

1,116,712. Specification of Letters Patent. Patented Nov. 10, 1914.

Application filed April 17, 1914. Serial No. 832,492.

*To all whom it may concern:*

Be it known that we, WILLIAM J. KNOX and FREDERICK J. HARRISON, both citizens of the United States, residing at Dubois, in the county of Clearfield and State of Pennsylvania, have invented certain new and useful Improvements in Brake Ratchet Mechanism, of which the following is a specification.

The invention relates to brake ratchet mechanism of the drop handle type in which the raising of the handle secures the engagement of the ratchet and its pawl or dog, and the lowering of the handle causes the disengagement of the pawl. The invention has for its primary objects, the provision of a construction in which the dog or pawl is fully set before the handle reaches horizontal position, whereby a secure engagement of the dog and ratchet are secured, even though the handle is not in its proper operative position when the setting of the brake is begun; the provision of a construction wherein the danger of the handle slipping from the hand of the operator is eliminated; the provision of a device of cheap and simple construction wherein the parts are easily assembled and disassembled; and the provision of a construction wherein the dog or pawl is very securely guided and supported in its operative positions. Certain embodiments of the invention are illustrated in the accompanying drawings, wherein—

Figure 1 is a side view of the assembled apparatus applied to a car, Fig. 2 is a front elevation of the apparatus of Fig. 1, Fig. 3 is an enlarged vertical section through the portion of the apparatus in which our invention particularly resides, Fig. 4 is a plan view of the apparatus of Fig. 3, Figs. 5, 6, and 7 are plan, sectional, and side views respectively of the cap, Figs. 8, 9, and 10 are plan, sectional and end views of the dog or pawl, Figs. 11 and 12 are plan and side elevation views respectively of the ratchet wheel, Figs. 13 and 14 are side and face views respectively of the handle, Fig. 15 is a face view of a modified type of handle, Figs. 16 and 17 are plan and sectional views respectively of a modification, Figs. 18 and 19 are sectional views of still another modification, the sectional view of Fig. 18 being taken on a horizontal plane intermediate the two ratchet wheels, Fig. 20 is a vertical section through the cap of another modified form of construction, and Fig. 21 is a vertical section through a modification differing slightly from that of Fig. 20.

Referring first to the general arrangement as shown in Figs. 1 and 2, 1 is the brake shaft supported in brackets and carrying at its lower end the usual brake drum 2; 3 is a holding ratchet wheel secured to the brake shaft and held against rotation when the brake is on, by means of the foot-operated pawl 4 (Fig. 2) which may be of any approved design; 5 is what may be termed the cap in which the mechanism in which our invention particularly resides is carried, and 6 is the operating drop handle shown in full lines in inoperative position and in dotted lines in operative position.

Referring now to Figs. 3 and 4 which illustrate a portion of the apparatus in which our invention particularly resides, the brake shaft 1 is preferably square in cross section and carries upon its upper end a casting consisting of a socket 7, a ratchet wheel 8, and a shaft portion 9 which is in effect a continuation of the brake shaft 1. The socket portion 7 is preferably held in position upon the end of the brake shaft 1 by means of the bolt 10. The shaft portion 9 is preferably provided with a circumferential groove 11, and the cap 5 is held against vertical movement upon the shaft 9 by means of the transverse rod 12 fitting in the groove 11 and having its ends riveted over as indicated at 13 in Fig. 4. Rotary motion of the cap with respect to the brake shaft is thus admitted, while at the same time all vertical movement is securely guarded against.

Extending transversely of the cap on one side of the shaft 9 is the pivot pin 14, such pivot pin being riveted over at its end as indicated at 15 (Fig. 4). Mounted upon the pivot pin 14 is the dog 16, such dog having at one end the hook portion 17ª engaging the pivot pin 14, and at the other end being provided with the plurality of downwardly projecting teeth 17 (Figs. 8 and 10), such teeth being adapted to coöperate with the teeth 18 upon the upper face of the ratchet wheel 8. The dog is provided with a perforation 19 (Fig. 8) through which the shaft 9 passes. The pawl or dog 16 is also provided at its right hand end with a projection 20 which fits into a vertical guide groove 21 formed in the cap 5 (Figs. 3, 5, and 6). It will be seen that by this arrangement the teeth of the dog are effectively supported against lateral movement due to the fact that the shaft 9 guides and supports the dog on one side of the teeth, and the guide groove 21 guides and supports the dog on the other side of such teeth. It will also be seen that the dog cannot become disengaged from its pivot pin 14 until the cap and dog are removed from the shaft 9. This arrangement permits the parts to be very easily assembled and disassembled.

The handle 6 is pivoted at 22 upon the cap 5, and is provided at one end with the loop-shaped portion 23, and at the other end with the cam portion 24. The handle is provided with the loop end 23 (Fig. 14) in order to provide a better grip for the hand of the operator, thus preventing accident or injury such as sometimes occurs with a straight handle when the operator's hand slips therefrom in applying the brake. As indicated in Fig. 3, the cam portion 24 on the handle engages the dog 16 and holds it out of engagement with the teeth of the ratchet wheel when the handle is in lowered or vertical position. In moving from vertical to horizontal position the cam 24 permits of the seating of the dog in full operative position when the handle reaches the inclined position marked A in Fig. 3, so that in case an attempt is made to set the brake at any time after the handle has passed the inclined position marked A, there will be a full and proper engagement between the teeth of the dog or pawl and the teeth of the ratchet wheel, thus eliminating the danger incident to slippage which sometimes occurs when an attempt is made to set the brake when the handle is not in full horizontal position. It will be seen that when the handle is in full horizontal position marked B (Fig. 3) there is a considerable amount of lost motion between the cam 24 and the dog, and we regard the provision of this lost motion between the cam and the dog—permitting of a considerable movement of the handle from horizontal to vertical position without starting to disengage the dog and ratchet wheel—as one of the valuable features of our invention. In order to limit the upward movement of the handle a stop $24^b$ is preferably provided on the handle, such stop engaging the casing 5 and preventing further upward movement of the handle when it reaches the horizontal position marked B.

Fig. 15 illustrates a slightly modified type of handle, the loop $24^a$ in this form of handle being made incomplete. The advantage achieved, however, is substantially the same.

Figs. 16 and 17 illustrate a modified construction involving the use of a brake shaft $1'$ circular in cross section instead of square, and the use of a holding ratchet wheel $3'$ located above the cap $5'$ instead of below it as is the case in the construction of Figs. 1 and 2. The ratchet wheel $8'$, the dog $16'$, and the handle $6'$ are the same as in the other type of construction.

Figs. 18 and 19 illustrate still another arrangement, the holding ratchet wheel $3^2$ being integral with the hub $7^2$ with which the other ratchet wheel $8^2$ is also integral. In this construction the cap $5^2$ is held in place by the member 25 secured by the rivet 26. The dog $16^2$ and the handle $6^2$ are constructed and operated as in the other constructions heretofore described.

In the construction of Fig. 20 the cap member $5^3$ is held in place by a handwheel 27 secured by the rivet 28, such handwheel carrying as an additional means for rotating the brake shaft $1^3$.

The construction of Fig. 21 is substantially the same as that of Figs. 3 and 4, with the exception that the shaft $1^4$ is circular in cross section, and except that a nut 29 is used to secure the cap $5^4$ in position, instead of the rod or pin 12 as used in the construction of Fig. 3. The ratchet wheel $8^4$, the dog $16^4$, and the handle 6 are the same as in the construction of Fig. 3.

It will also be noted that in this type of construction the shaft $1^4$ extends through the ratchet wheel $8^4$ and to the top of the cap, as opposed to the construction of Fig. 3 in which the brake shaft is in substantially two pieces, the upper portion 9 constituting in effect a continuation of the lower portion 1.

What we claim is:

1. In combination, a brake shaft, a ratchet wheel non-rotatable with respect to the brake shaft below its upper end and having its upper face toothed, a support carried rotatably upon the upper end of the brake shaft, a dog straddling the brake shaft pivoted to the support on one side of the brake shaft and engaging the teeth of the ratchet on the other side of the brake shaft, and a handle pivoted to the support and adapted in its lower position to disengage the dog from the ratchet wheel and in its upper position to permit the engagement of the dog with the ratchet wheel.

2. In combination, a brake shaft, a ratchet wheel non-rotatable with respect to the brake shaft below its upper end and having its upper face toothed, a support carried rotatably upon the upper end of the brake shaft, a dog pivoted to the support on one side of the brake shaft and engaging the teeth of the ratchet on the other side of the brake shaft, guide means carried by the cap and engaging the free end of the dog, and a handle pivoted to the support and adapted in its lower position to disengage the dog from the ratchet wheel and in its upper position to permit the engagement of the dog with the ratchet wheel.

3. In combination, a brake shaft, a ratchet wheel non-rotatable with respect to the brake shaft below its upper end and having its upper face toothed, a support carried rotatably upon the upper end of the brake shaft, a dog through which the shaft extends supported for vertical movement with respect to the support and having at one side means for engaging the teeth of the ratchet, guide means carried by the support and engaging the portion of the dog having the tooth engaging means, and a handle pivoted to the support and adapted in its lower position to disengage the dog from the ratchet wheel and in its upper position to permit the engagement of the dog with the ratchet wheel.

4. In combination, a brake shaft, a ratchet wheel rotatable with the shaft and having its upper surface toothed, a cap carried rotatably upon the upper end of the shaft, a pivot pin carried by the cap on one side of the shaft, a dog perforated to permit the passage therethrough of the shaft and having one end hooked to fit over the said pivot pin, and having its other end adapted to engage the teeth of the ratchet wheel, and a drop handle pivoted to the cap and provided with means for operating the dog.

5. In combination, a brake shaft, a ratchet wheel non-rotatable with respect to the brake shaft and having its upper face toothed, a support carried rotatably upon the upper end of the brake shaft, a dog straddling the brake shaft pivoted to the support on one side of the brake shaft and having a toothed portion engaging the teeth of the ratchet on the other side of the brake shaft, and a handle pivoted to the support and provided with a dog operating part which engages the said toothed portion of the dog and raises it when the handle is in lowered position.

In testimony whereof we have hereunto signed our names in the presence of the two subscribed witnesses.

WM. J. KNOX.
F. J. HARRISON.

Witnesses:
HARRY T. SMITH,
W. I. FINCH.